(12) United States Patent
Kushler et al.

(10) Patent No.: US 7,164,367 B2
(45) Date of Patent: Jan. 16, 2007

(54) COMPONENT-BASED, ADAPTIVE STROKE-ORDER SYSTEM

(75) Inventors: Clifford A. Kushler, Lynnwood, WA (US); Michael R. Longe, Seattle, WA (US); Pim Van Meurs, Seattle, WA (US); Keng Chong Wong, Seattle, WA (US)

(73) Assignee: America Online, Inc., Dulles, VA (US)

( * ) Notice: Subject to any disclaimer, the term of this patent is extended or adjusted under 35 U.S.C. 154(b) by 348 days.

(21) Appl. No.: 10/488,314

(22) PCT Filed: Aug. 28, 2002

(86) PCT No.: PCT/US02/27455

§ 371 (c)(1),
(2), (4) Date: Feb. 27, 2004

(87) PCT Pub. No.: WO03/021788

PCT Pub. Date: Mar. 13, 2003

(65) Prior Publication Data

US 2004/0239534 A1 Dec. 2, 2004

(51) Int. Cl.
*H03M 11/00* (2006.01)
(52) U.S. Cl. .................. 341/28; 345/171; 715/811; 710/67
(58) Field of Classification Search .............. 341/28, 341/22; 345/171; 715/811; 710/67
See application file for complete search history.

(56) References Cited

U.S. PATENT DOCUMENTS

| | | | |
|---|---|---|---|
| 4,286,329 A | 8/1981 | Goertzel et al. ............ 364/900 |
| 4,684,926 A | 8/1987 | Yong-Min ................... 340/365 |
| 5,109,352 A | 4/1992 | O'Dell ....................... 707/442 |
| 5,187,480 A * | 2/1993 | Thomas et al. .............. 341/22 |
| 5,197,810 A | 3/1993 | Zhang et al. ............... 400/110 |
| 5,304,988 A | 4/1994 | Seto et al. .................. 341/141 |
| 5,586,198 A | 12/1996 | Lakritz ...................... 382/185 |
| 5,860,075 A | 1/1999 | Hashizume et al. ........ 707/530 |
| 5,930,048 A | 7/1999 | Seto et al. .................. 382/301 |
| 6,005,549 A | 12/1999 | Forest ........................ 345/157 |
| 6,011,554 A | 1/2000 | King et al. ................. 345/352 |
| 6,014,625 A | 1/2000 | Lee ............................ 704/270 |
| 6,028,959 A | 2/2000 | Wang et al. ................ 382/185 |
| 6,054,941 A | 4/2000 | Chen .......................... 341/28 |
| 6,148,104 A | 11/2000 | Wang et al. ............... 382/185 |
| 6,172,625 B1 | 1/2001 | Jin et al. ...................... 341/67 |

(Continued)

FOREIGN PATENT DOCUMENTS

CN 1180187 A 4/1998

(Continued)

*Primary Examiner*—Albert K. Wong
(74) *Attorney, Agent, or Firm*—Michael A. Glenn; Glenn Patent Group

(57) ABSTRACT

An efficient and simple approach to encoding ideographic characters as sequences of input strokes or stroke categories is disclosed, wherein: each character is represented by one or more sequences of one or more components; each component corresponds to a plurality of alternative stroke sequences, each of which is associated with a probability that it will be the sequence which the user enters to specify the given component or character; and the probability associated with the user's preferred stroke sequence is automatically increased by the system when the character is selected, thus automatically adapting to a user's preferences.

40 Claims, 3 Drawing Sheets

U.S. PATENT DOCUMENTS

| | | | |
|---|---|---|---|
| 6,307,548 B1 * | 10/2001 | Flinchem et al. | 715/811 |
| 6,636,162 B1 * | 10/2003 | Kushler et al. | 341/28 |
| 6,646,573 B1 * | 11/2003 | Kushler et al. | 341/28 |
| 6,795,579 B1 * | 9/2004 | Tang et al. | 382/185 |
| 2002/0136499 A1 | 9/2002 | Guo | |
| 2004/0163032 A1 | 8/2004 | Guo et al. | |

FOREIGN PATENT DOCUMENTS

| | | |
|---|---|---|
| JP | 62-180458 | 8/1987 |
| JP | 05-081482 | 4/1993 |
| JP | 08-305701 | 11/1996 |
| JP | 11-328312 | 11/1999 |
| WO | WO 2004/111812 | 3/2006 |

\* cited by examiner

COMPONENT-BASED, ADAPTIVE STROKE-ORDER SYSTEM

BACKGROUND OF THE INVENTION

1. Technical Field

The invention relates to a method for identifying characters when entered as strokes. More particularly, the invention relates to a component-based, adaptive stroke order system for fast entry of ideographic language characters.

2. Description of the Prior Art

For many years, portable computers have been getting smaller and smaller. The principal size-limiting component in the effort to produce a smaller portable computer has been the keyboard. If standard typewriter-size keys are used, the portable computer must be at least as large as the keyboard. Miniature keyboards have been used on portable computers, but the miniature keyboard keys have been found to be too small to be easily or quickly manipulated by a user.

Incorporating a full-size keyboard in a portable computer also hinders true portable use of the computer. Most portable computers cannot be operated without placing the computer on a flat work surface to allow the user to type with both hands. A user cannot easily use a portable computer while standing or moving.

Recent advances in two-way paging, cellular telephones, and other portable wireless technologies have led to a demand for small and portable two-way messaging systems, and especially for systems which can both send and receive electronic mail ("e-mail").

It would therefore be advantageous to develop a keyboard for entry of text into a computer device that is both small and operable with one hand while the user is holding the device with the other hand. Prior development work has considered use of a keyboard that has a reduced number of keys. As suggested by the keypad layout of a touch-tone telephone, many of the reduced keyboards have used a 3-by-4 array of keys.

Chinese, Japanese, and Korean scripts are based on ancient Chinese characters which make up an ideographic language comprising more than 50,000 characters.

The characters of an ideographic language are each composed of simpler, constituent parts known as components. Components are the building blocks of ideographic characters and combine in certain predetermined ways to form the characters of an ideographic language. Under current practice, a set of 214 components is used in various combinations to produce the characters of the Chinese language. Each component, in turn, is made up a series of specific and precisely defined strokes. There are currently about 40 individual stroke shapes in use which, based on variations in size, require the mastery of 82 strokes before practical writing skills for Chinese ideographs are obtained.

Recent work in fonts, following ISO 10646, the Unicode system, has attempted to describe ideographic characters in terms of smaller functional units rather than directly representing all characters as code points in all of their forms and variations. See, for example, Qin Lu, Ideographic Composition Scheme and Its Applications in Chinese Text Processing (date unknown).

The sheer size of ideographic languages presents unique challenges for specifying and identifying individual characters, particularly for data entry and data processing. Various schemes have been proposed and descriptions can be found in the literature. See, for example, Y. Chu, Chinese/Kanji Text and Data Processing, IEEE Computer (January 1985); J. Becker, Typing Chinese, Japanese, and Korean, IEEE Computer (January 1985); R. Matsuda, Processing Information in Japanese, IEEE Computer (January 1985); R. Walters, Design of a Bitmapped Multilingual Workstation, IEEE Computer (February 1990); and J. Huang, The Input and Output of Chinese and Japanese Characters, IEEE Computer (January 1985); R. Odell, *System far Encoding a Collection of Ideographic Characters*, U.S. Pat. No. 5,109,352 (28 Apr. 1992); R. Thomas, H. Stohr, *Symbol Definition Apparatus*, U.S. Pat. No. 5,187,480 (16 Feb. 1993); and B. Hu, Y. Hu, *Stroke Entry Key Position Distribution and its Screen Prompts*, Chinese Patent Application No. 96120693.4 (Published 29 Apr. 1996).

Most of these schemes require that the user enter predefined codes or follow a predetermined order of entry of strokes or components. Strokes for each character must be entered in the traditional order taught in school. But for both native speakers and those who have learned an ideographic language later in life, the order of strokes and components is not always obvious and may be difficult to remember for infrequently used characters. Teachers living in different parts of the countries where the language is written may introduce variations in style and order, and older people have developed their own ordering over the course of decades of writing the characters by hand.

It would be advantageous therefore to provide a scheme for entering strokes and components and selecting characters that would allow or adapt to users' preferred ordering of those strokes or components for each character.

SUMMARY OF THE INVENTION

The invention provides an efficient and simple method for entering strokes and components to select characters in ideographic languages and for adapting to the user's preferred ordering of strokes and components.

In a preferred embodiment of the invention, a database record is maintained for each potential character and for the components comprising it, along with information about the sequence of strokes corresponding to each component. The database is searched each time a stroke is entered into the system by a user. Characters with components that match the sequence up to that point are prioritized based on an appropriate linguistic model. The system displays the matching characters in prioritized order and allows the user to scroll through the displayed characters if necessary to select the desired character. Each time a character is selected, the stroke sequences for the components that comprise the character are reprioritized. If a record does not exist for a stroke sequence, the system may add a new record to the database.

In the preferred embodiment of the invention, there is a corresponding ideographic description database that efficiently represents each character as a set of components positioned within a character grid.

In another embodiment of the invention, one or more individual characters may be represented by strokes alone.

DETAILED DESCRIPTION OF THE INVENTION

The preferred embodiment as described herein is a reduced keyboard system with a small display, such as a mobile phone. In this embodiment, one of a small number of keys is pressed to enter a stroke. Each stroke entry key is associated with one stroke category; a stroke category represents one or more hand-drawn strokes of similar shape or size. The user of the system performs the mapping between the actual stroke and the corresponding stroke category in his head to determine which key to press. Therefore, "stroke," "stroke category," and "stroke entry" may be considered equivalent in describing the preferred embodiment of this invention. In addition, there may be a wildcard key to match any stroke in case the proper stroke category cannot be determined by the user.

In an alternative embodiment of the system, stroke entry is performed by means of handwriting recognition of stylus, finger, or hand gestures on a touchscreen or stylus tablet. The gestures may be mapped to predefined stroke categories or they may be given a recognition score that is considered in the component matching algorithm.

In other embodiments of the system, the strokes may be mapped to keys on a personal computer keyboard or to the buttons on a remote control, e.g. for a set-top box.

Figure 1:
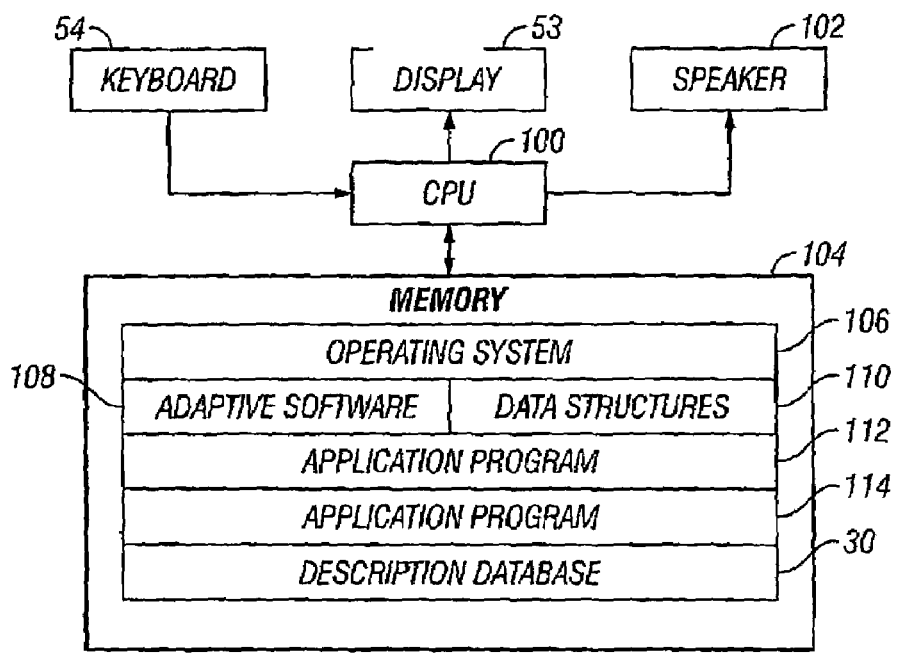
FIG. 1 is a hardware block diagram of the component-based, adaptive stroke order system according of the invention.

A block diagram of the preferred embodiment is provided in FIG. 1. The keyboard 54 and the display 53 are coupled to a processor 100 through appropriate interfacing circuitry. An optional speaker 102 is also coupled to the processor. The processor 100 receives input from the keyboard, and manages all output to the display and speaker. Processor 100 is coupled to a memory 104. The memory includes a combination of temporary storage media, such as random access memory (RAM), and permanent storage media, such as read-only memory (ROM), floppy disks, hard disks, or CD-ROMs. Memory 104 contains all software routines to govern system operation. Preferably, the memory contains an operating system 106, adaptive stroke-order software 108, and associated data structures 110. The memory also includes an ideographic description database 30. Optionally, the memory may contain one or more application programs 112, 114. Examples of application programs include word processors, software dictionaries, and foreign language translators. Speech synthesis software may also be provided as an application program, allowing the reduced keyboard system to function as a communication aid.

Figure 2:
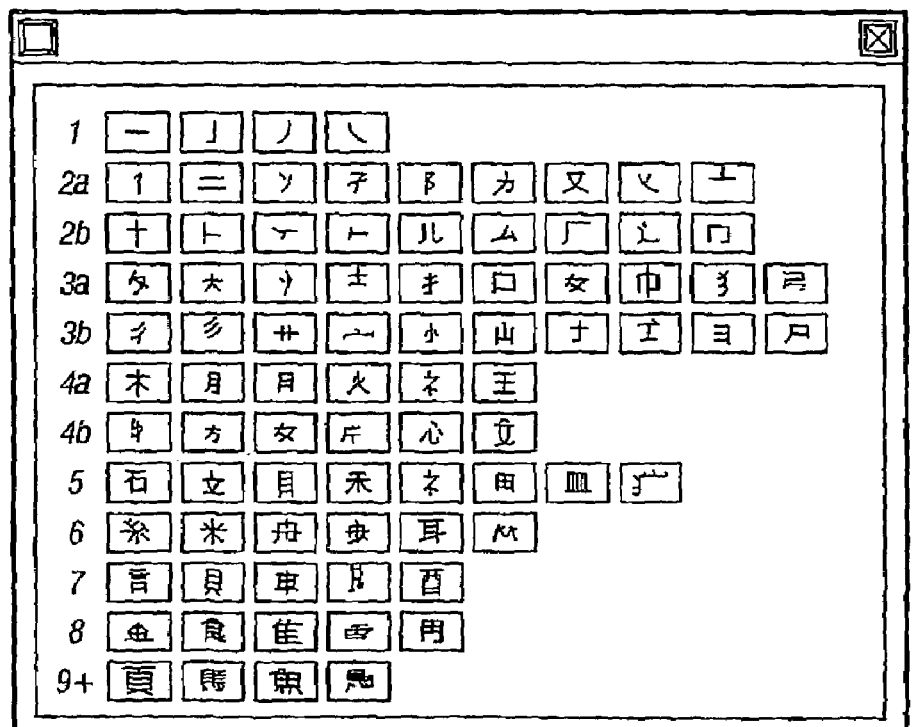
FIG. 2 shows a table of kanji components arranged in order of number of strokes need to form the component.

A table 153 is shown in FIG. 2, and consists of 82 components arranged by number of strokes, i.e. 1 to 9 or more strokes, as shown in the column at the far left side of the display. A stroke is traditionally defined to be an element of an ideographic character that can be drawn with one complete motion without lifting the pen from the paper.

Rather than identifying a character as a sequence of strokes, the preferred embodiment of the invention identifies a character as a sequence of component parts. The system defines components that can be assembled into characters. Characters are represented as a combination of one or more sets of one or more components, and each set of components may be ordered in a unique sequence. Some characters can be represented as sets of different components and even have a different number of components in each set.

In an alternative embodiment, each individual stroke may also be a component in the system, and thus a character may be represented as a combination of either strokes or components or both.

The components themselves are composed of strokes that are written in a certain order. For each component, a set of alternate stroke sequences is provided that corresponds to some or all of the possible ways that a user can enter the sequence of strokes for that component. Each of these stroke sequences is optionally associated with a dynamic priority where, at system initialization, the most common or correct sequence is given a very high priority. Each of the other alternate sequences is given a lower priority appropriate to the probability of being used to enter the component.

Provision must be made for alternate versions of component stroke sequences that are of different lengths; for example, for following a split case, such as "mouth" (or "box") which typically have the first two strokes (vertical, corner) followed by some other component(s) (inside the box), followed by the closing stroke of "mouth" (horizontal); and for simple stroke misinterpretations. In one embodiment of the invention, each component is constrained to have the same number of strokes for each stroke sequence, and the system provides two different component records to handle these cases. In another embodiment, the second half of the split case is combined with each embedded component to create unique component records for each needed combination.

An appropriate linguistic model represents the initial frequency of a character relative to other characters, or the probability that the user intends to select that character next. Frequency may be determined by the number of occurrences of the character in written text or in conversation; by the grammar of the surrounding sentence; by its occurrence following the preceding character or characters; by the context in which the system is currently being used, such as typing names into a phonebook application; by its repeated or recent use in the system (the user's own frequency or that of some other source of text); or by any combination thereof. In addition, a character may be prioritized by the probability that a matching component occurs in the character at that point in the entered stroke sequence.

Characters are initially prioritized based on the linguistic model and displayed to the user in that order. If any strokes have been entered, only those characters are displayed that have components with at least one stroke sequence matching the strokes entered so far.

Figure 3:
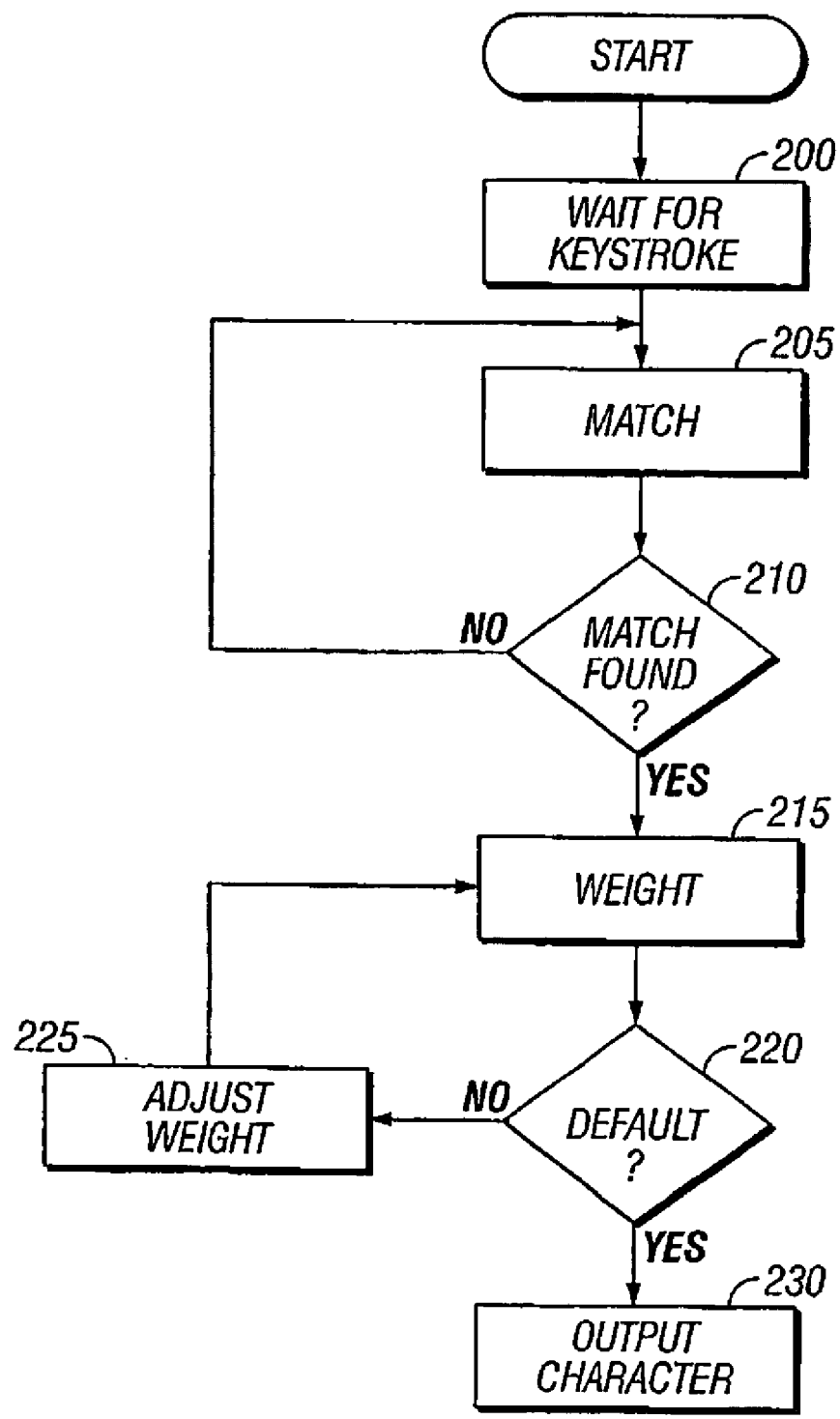
FIG. 3 is a flow chart of the matching algorithm for the component-based, adaptive stroke order system of FIG. 1.

In addition to displaying possible characters, the system may also display possible components, indicated with an underbar for example. After the user selects a component, the system shows only those characters that contain that component. FIG. 3 is a simplified flow diagram showing operation of a preferred embodiment of the invention.

As the user enters strokes (200), that sequence of strokes is matched (205) against the stroke sequence records for each component. Each possible component is identified (210) at each point in the stroke sequence and weighted (215, 225) according to the current priority of the matching stroke sequence. If the user enters a stroke sequence corresponding to the original default correct stroke sequence (220), there is a very high likelihood of a match and a character is output (230).

If the user enters a character by matching some sequence including one or more or fairly low-priority matches (220), then that character is not identified as a very likely candidate. In the system's initial state, the user must enter more of the keystrokes of that character, but normally would not have to correct the strokes. Eventually, the user enters enough strokes and is able to select the intended character, even though the user chose alternative stroke sequences for one or more of the components in that character. Thus, the system learns that the strokes that the user entered were the strokes that this user believes are the appropriate strokes for this character. The system can then trace back and dynamically change the priorities so that with some degree of usage, the system dynamically adjusts to the user's concept of the correct stroke sequence for these various components. The system determines that the user is likely to use that same stroke sequence in any of the characters in which a particular component appears.

Note that the system should not rapidly adapt to mistakes, e.g. when the user transposes two strokes accidentally. The system requires some number of repetitions to cause an alternate order to become the preferred order.

Thus, the invention provides an adaptive system, i.e. one that adapts to the user's own concept of the stroke sequence without having to be reconfigured or manually rearranged in any way. In this way, the system allows the user to enter strokes according to his own preference. Accordingly, the user is ultimately successful in finding the character, rather than having to backtrack and guess at the stroke sequence. The user may have to enter more strokes initially, but as the system adapts, the number of strokes that must be entered may be reduced to approximately two per character.

Figure 4:
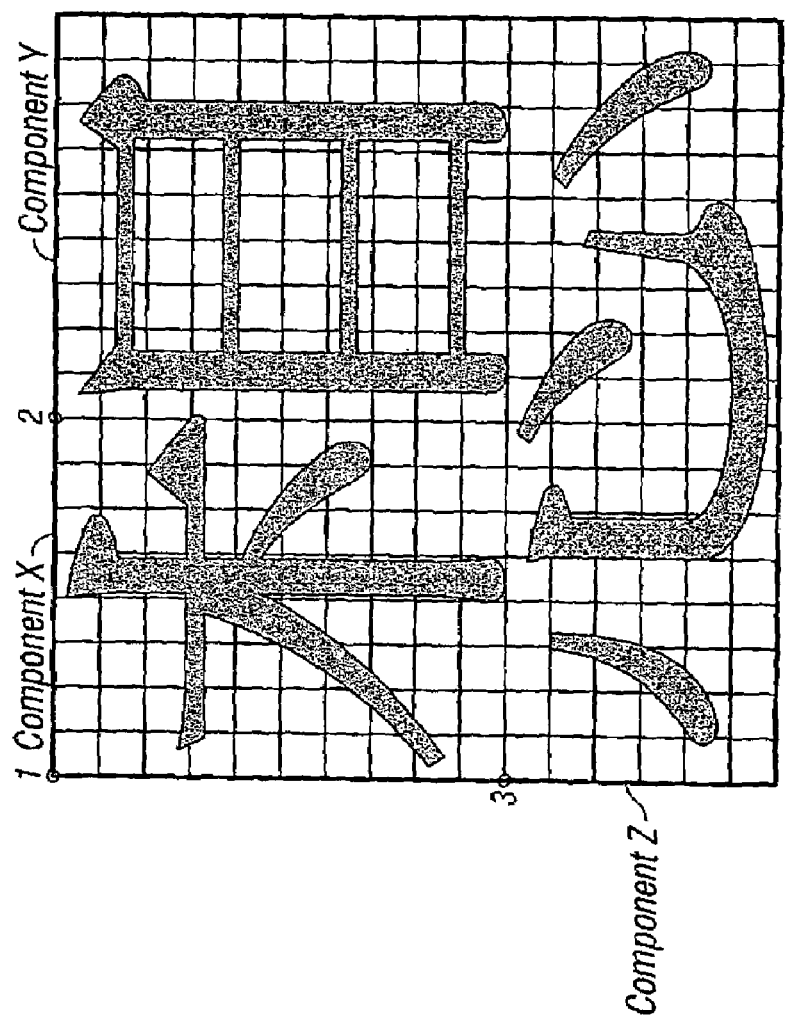
FIG. 4 shows an embodiment of the invention that stores a small image of each character's components such that a character is comprised of a component and its position within a grid.

A further aspect of the invention improves the efficiency and storage requirements of the system. Instead of storing a large amount of image data, e.g. 16 bits by 16 bits for each and every character in the character set, the system stores a small image of each of the character's components. A character can then be described, for example, as Component X at Position 1 and Component Y at Position 2 and Component Z at Position 3, as shown in FIG. 4. Accordingly, this feature of the invention defines a set of components and their position within a grid, e.g. a 16 by 16 grid. As the position of a component within a character may change its appearance, and there may be regional variations in how a component or character is drawn, the system may also store component variations on a per-location basis.

The characters are constructed programmatically on the screen. The image data graphically representing each component is drawn at the proper position for the character as defined in the ideographic description database (30).

In an alternative embodiment, a font file contains integrated component and stroke data in an efficient format, so that each character entry describes both how it is displayed and how it is entered.

The system herein disclosed is designed to be easily customized for any number of ideographic languages, e.g. Japanese, Korean, traditional Chinese, or simplified Chinese. The ideographic description database may be provided as a software module that is readily exchanged with another module, should a different ideographic language be desired. Additionally, several such modules may be provided and the invention may include a selection menu for choosing between any of the several database modules. In this way, one may have several ideographic languages available for use at any given time. This gives the invention a great deal of flexibility in its implementation across a variety of ideographic languages. It is also easy to generate new characters by updating the ideographic description database.

Figure 5:
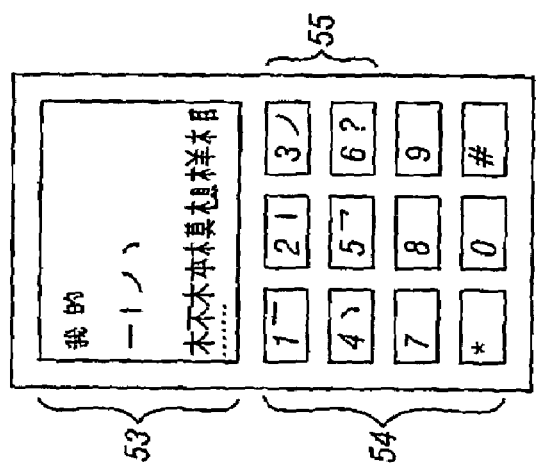
FIG. 5 shows a stroke entry means and display according to the invention.

In FIG. 5, a sample reduced keyboard 54 is shown and consists of keys 55 by which the user may enter strokes during the construction of a character.

The display 53 is dynamically updated to show likely characters and components upon the entry of strokes and the selection of components and characters. If the display is not large enough to present all of such matches simultaneously, and so that user can find a character with a low-probability stroke order, a scrollbar or Page Up/Down keys may be used to scroll additional matched characters onto the display.

If the user cannot find a desired character or wants to create a new association between strokes or components and a character, other input methods, e.g. phonetic Pinyin, can be used to select a desired character. Alternately, the user may select the common structure of the character, e.g. two components side-by-side, and even select one of the component positions and specify the component for that position. By this process, the user can identify the character by specifying one or more attributes of the character.

The user may also select from one or more predefined grid arrangements to identify the kind of character. The user may also select the position of each component and the component for such position.

The output code produced as a result of user character selection can be used to input the character into an email message or other text entry field.

Although the invention is described herein with reference to the preferred embodiment, one skilled in the art will readily appreciate that other applications may be substituted for those set forth herein without departing from the spirit and scope of the present invention.

Accordingly, the invention should only be limited by the claims included below.

The invention claimed is:

1. A method of entering characters in an ideographic language, comprising the steps of:
   maintaining a record for each one of one or more characters, which comprises one or more sequences of one or more components;
   further maintaining a record for each of one or more components which comprises one or more sequences of entered strokes or stroke categories, each sequence associated with a dynamic priority:
   entering strokes or stroke categories;
   comparing strokes or stroke categories and component sequences and matching one or more characters; and
   displaying one or more matched characters.

2. The method of claim 1, further comprising the step of:
   prioritizing characters that match a stroke entry sequence according to a linguistic model.

3. The method of claim 2, where the linguistic model may include one or more of:
   frequency of occurrence of a character in formal or conversational written text;
   frequency of occurrence of a character when following a preceding character or characters;
   proper or common grammar of the surrounding sentence;
   application context of current character entry; and
   recency of use of repeated use of the character by the user or within an application program.

4. The method of claim 1, further comprising the step of:
   prioritizing a character according to the probability that a component with a matching stroke sequence occurs in said character at that point in an entered stroke sequence.

5. The method of claim 1, further comprising the step of:

prioritizing each alternate stroke sequence of a component according to the probability that said stroke sequence will be entered by the user to specify said component.

6. The method of claim 1, further comprising the step of:
for each component identified by matching all or a part of the stroke entry sequence with one of the stroke sequences associated with said component, using a priority associated with said stroke sequence to adjust the priority of the character or characters containing said component.

7. The method of claim 1, further comprising the step of:
once a character is selected, changing the associated priority of each matching stroke sequence of each component of said character, and optionally changing an associated priority of each non-matching stroke sequence of each component of said character.

8. The method of claim 1, further comprising the step of:
recording that a stroke entry sequence that a user enters for a particular component via a first selection mechanism is an appropriate stroke entry sequence for said component.

9. The method of claim 8, further comprising the step of:
either of creating a new association between a stroke entry sequence and a component, and creating a new association between a component sequence and a character.

10. The method of claim 9, wherein a desired component or character is specified through a second selection mechanism.

11. The method of claim 1, further comprising the step of:
displaying possible components, in addition to displaying one or more matched characters, wherein said components are optionally indicated with an underbar.

12. The method of claim 11, further comprising the step of:
showing only those characters that contain a component selected by a user.

13. The method of claim 1, wherein gestures are used for stroke entry.

14. The method of claim 13, further comprising the step of:
recognizing and mapping said gestures to predefined stroke categories.

15. The method of claim 13, further comprising the step of:
assigning a recognition score to each said gesture that is considered in a component-matching algorithm.

16. The method of claim 1, wherein an ideographic character description database is provided for describing the appearance of characters and component objects.

17. The method of claim 16, further comprising the step of:
defining a character set of components and component positions within a grid.

18. The method of claim 17, further comprising the step of:
defining a character as a set of components and component positions within a grid.

19. The method of claim 18, further comprising the step of:
creating a new association between a character, a set of components, and a set of component positions.

20. The method of claim 18, further comprising the step of:
allowing the user to select from one or more predefined grid arrangements to identify the kind of character.

21. The method of claim 18, further comprising the step of:
allowing the user to select the position of each component and the component for said position.

22. The method of claim 1, wherein input sequences identifying a multi-part component are represented by at least one of a set of linked records or by separate component records.

23. The method of claim 1, wherein an object is added to a memory if an object does not exist for an input sequence.

24. The method of claim 1, wherein one of the plurality of inputs is associated with a special wildcard input that is associated with any or all stroke or stroke category.

25. The method of claim 18, further comprising the step of:
displaying each displayable character as a set of objects positioned within a character grid.

26. The method of claim 1, wherein components are displayed as character interpretations of identified objects; and wherein after a component is selected only characters containing said selected components are further displayed or reprioritized.

27. A system for selecting strokes to select characters in an ideographic language, comprising:
a user input device having a plurality of inputs, each of said plurality of inputs being associated with a plurality of user strokes that make up a character or its component parts, an input sequence being generated each time an input is selected by manipulating the user input device, wherein a generated sequence corresponds to a sequence of inputs that have been selected;
a memory containing a plurality of objects, comprising character objects that are ideographic characters and component objects that comprise components corresponding to the components of a character, each of the component objects being associated with one or more input sequences, wherein each of the one or more input sequences associated with a component object is associated with a dynamic priority;
an output device to provide system output to the user; and
a processor coupled to the user input device, memory, and output device, the processor identifying from the plurality of objects contained in the memory any object associated with each generated input sequence, and optionally generating output signals causing the output device to provide the user any object or objects as character interpretations of the entered input sequence.

28. The system of claim 27, wherein order of said priorities is initially based on an appropriate linguistic model.

29. The system of claim 27, wherein an object having a highest priority is automatically selected.

30. An ideographic language text input system comprising:
a user input device comprising:
a plurality of inputs, each of the plurality of inputs associated with a stroke or stroke category, an input sequence being generated each time an input is selected by manipulating the user input device, wherein a generated input sequence corresponds to a sequence of inputs that have been selected; and
at least one selection input for generating an object output, wherein
a stroke input sequence is terminated when the user manipulates the user input device to a selection input;
a memory containing a plurality of objects, wherein each of the plurality of objects is associated with an input sequence and a dynamic priority;
a display to depict system output to the user; and a processor coupled to the user input device, memory, and display, said processor comprising:
  an identifying means for identifying from the plurality of objects in the memory any object associated with each generated input sequence;
  an output means for displaying on the display the character interpretation of any identified objects associated with each generated input sequence; and
  a selection means for selecting the desired character for entry into a text entry display location upon detecting the manipulation of the user input device to a selection input.

31. The system of claim 30, wherein said selection means selects a desired character based upon identification of objects having a highest priority based on a linguistic model.

32. The system of claim 30, wherein input sequences identifying a multi-part component are represented by at least one of a set of linked records or by separate component records.

33. The system of claim 30, wherein an object is added to a memory if an object does not exist for an input sequence.

34. The system of claim 30, wherein one of the inputs is associated with a special wildcard input that is associated with any or all strokes or categories.

35. The system of claim 30, wherein an ideographic character description database is provided for describing the appearance of characters and component objects.

36. The system of claim 35, wherein each displayable character is represented as a set of objects positioned within a character grid.

37. The system of claim 30, wherein components are displayed as character interpretations of identified objects; and wherein after a component is selected only characters containing said selected component are further displayed or reprioritized.

38. The method of claim 1, further comprising the step of:
  each time a character is selected, reprioritizing input sequences for components that comprise said character.

39. The system of claim 27, wherein each time a character is selected, input sequences for components that comprise said character are reprioritized.

40. The system of claim 30, wherein each time a character is selected, input sequences for components that comprise said character are reprioritized.

* * * * *